March 29, 1932.  J. W. GORDON  1,851,276
TUBE CUTTING AND FLARING MACHINE
Filed June 11, 1930  2 Sheets-Sheet 2
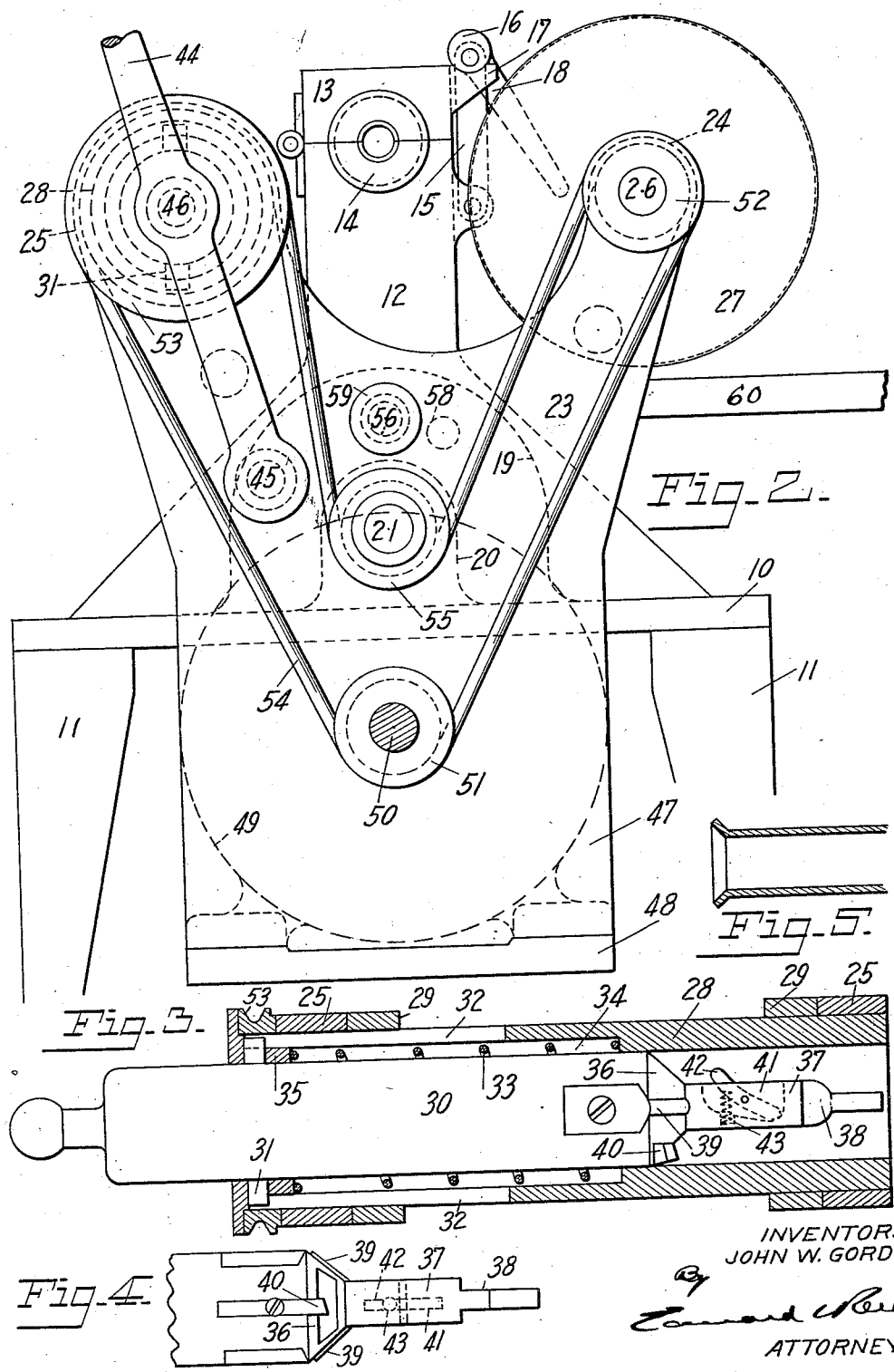
INVENTOR.
JOHN W. GORDON.
By Edward Reed
ATTORNEY.

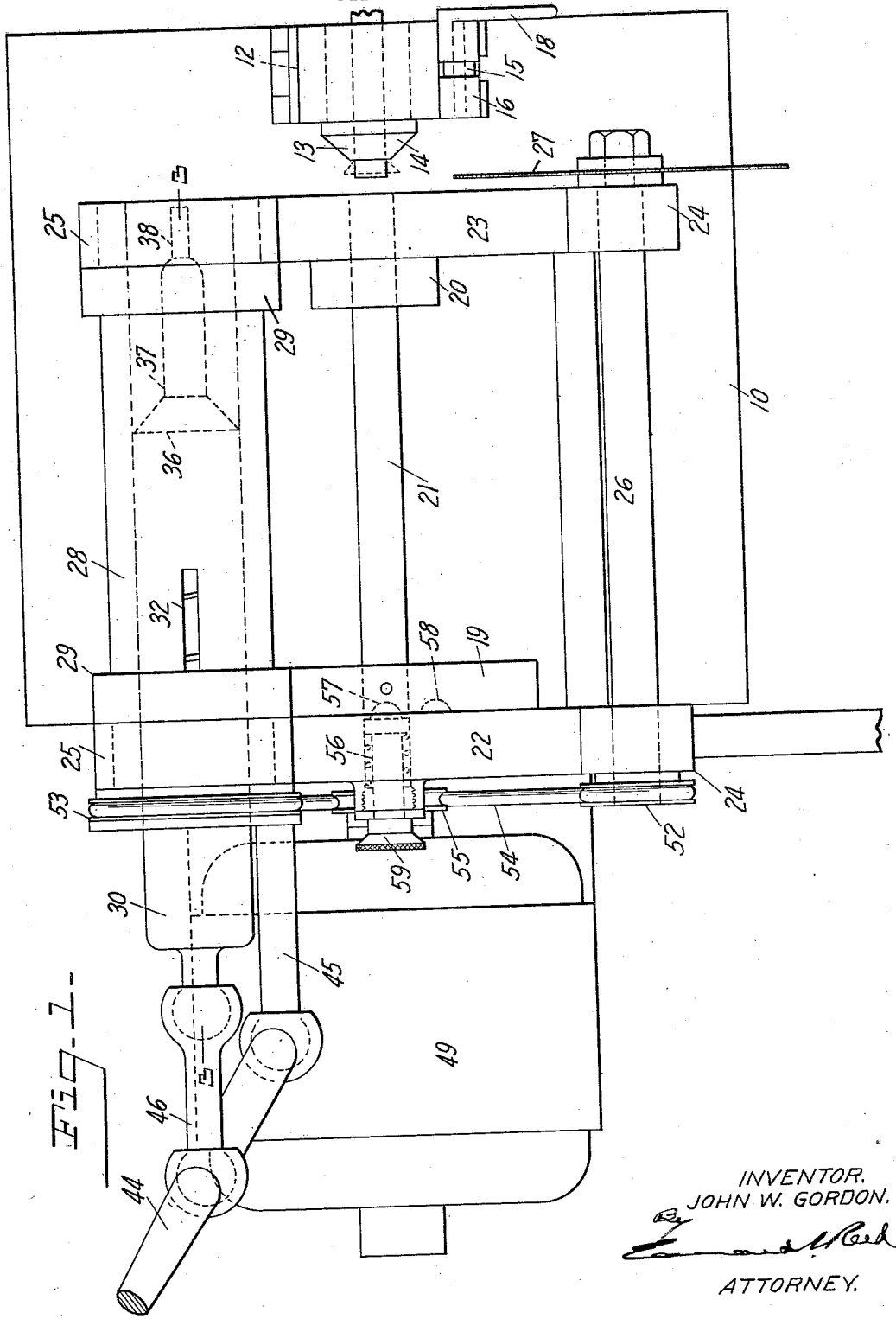

Patented Mar. 29, 1932

1,851,276

UNITED STATES PATENT OFFICE

JOHN W. GORDON, OF DAYTON, OHIO, ASSIGNOR TO THE GORDON-DUNNAM MANUFACTURING COMPANY, OF DAYTON, OHIO, A CORPORATION OF OHIO

TUBE CUTTING AND FLARING MACHINE

Application filed June 11, 1930. Serial No. 460,519.

This invention relates to a tube cutting and flaring machine, and one object of the invention is to provide a simple efficient machine to cut or trim the ends of tubes and to flare the same.

A further object of the invention is to provide such a machine having cutting and flaring instrumentalities arranged to act successively upon a tube and of such a character that the machine may be easily and quickly operated to complete the operation.

A further object of the invention is to provide such a machine with a flaring device which will impart to the end of the tube a smooth uniform flare free from burrs or rough edges.

A further object of the invention is to provide such a machine with a cutter which will sever a tube of thin flexible metal such as copper without crushing the same.

Other objects of the invention will appear as the mechanism is described in detail.

In the accompanying drawings Fig. 1 is a top plan view of a machine embodying my invention; Fig. 2 is a rear end elevation, partly in section; Fig. 3 is a sectional detail view of the mandrel supporting member, taken on the line 3—3 of Fig. 1 and showing the mandrel in elevation; Fig. 4 is a detail view of one end of the mandrel to show the trimming cutter; and Fig. 5 is a sectional view of the flared end of the tube.

In these drawings I have illustrated one embodiment of my invention, but it will be understood that this particular embodiment has been chosen for the purposes of illustration only and that the invention may take various forms without departing from the spirit of the invention.

In that embodiment here illustrated the machine comprises a supporting structure or base 10 which, as here shown, is mounted upon legs 11. This base has at one end, which may be called its front end, an upwardly extending portion or standard 12 provided near its upper end with means for supporting the tube which is to be cut and flared. Preferably the tube-supporting means is in the nature of a clamp and, as here shown, a clamping member 13 is hinged to the upper end of the standard 12 and the adjacent surfaces of the clamping member and standard are recessed to receive the tube. In the present instance, a two-part bushing 14 has its parts mounted respectively in the upper end of the standard and the clamping member, and the two parts of this bushing are provided with alined recesses to receive the tube. The bushing being readily removable it is obvious that by substituting one bushing for another various sizes of tubes may be supported within the clamping device. The clamping member may be secured in its closed position in any suitable manner but, as here shown, a link 15 is pivotally connected with the standard 12 and has at its upper end a cam or eccentric 16 arranged to engage over lugs 17 on the clamping member 13, the cam being provided with an operating handle 18.

Mounted upon the supporting structure or base 10 is a frame which is movable transversely to a tube mounted in the tube support or clamp. This frame carries a rotary cutter and a mandrel so arranged that the movement of the frame will bring these two devices successively into operative relation to the tube. The mandrel is mounted for both rotatory movement and for axial movement and after the end of the tube has been severed the mandrel is moved into line therewith and forced inwardly, while rotating, to engage and flare the end of the tube. The frame may take various forms and may be mounted in any suitable manner. In the present mechanism the base 10 has upwardly extending brackets or lugs 19 and 20 provided with apertures in which is mounted a shaft 21, which is preferably fixed against rotation and extends lengthwise of the tube on the tube support. The lug 20 is located in line with but spaced inwardly from the standard 12. The frame comprises a rear member 22 and a front member 23, rigidly connected one to the other and pivotally supported on the shaft 21, the frame member 23 being located between the lug 20 and the standard 12. Each frame member is provided in the upper portion thereof and near its lateral edges with bearings 24 and 25, the corresponding bearings in the two frame members being arranged in alinement. In the present construction the frame members are cut away between the two bearings so that in effect the bearings of each frame member are carried by diverging arms. Rotatably mounted in the alined bearings 24 of the two frame members is a shaft 26 one end of which projects beyond the front frame member 24 and has rigidly secured thereto a cutter 27, which is preferably in the nature of a rotatable disk. This cutter is so arranged with relation to the frame and the standard 12 that when the frame is moved transversely to the standard the cutter will clear the adjacent end of the boss 14 forming part of the tube support, and if there is a tube supported in and projecting beyond said boss the end of the tube will be engaged by the cutter and severed. The cutter is rotated at a very high speed and will sever the end of a soft-metal tube without crushing or distorting the same.

Rotatably mounted in the bearings 25 of the two frame members is a tubular member 28 which is held against axial movement by collars 29 secured thereto and abutting against the respective bearings. Slidably mounted within the tubular member 28 is a mandrel 30 which is so connected with the tubular member that it will rotate therewith. In the arrangement here shown a pin 31 extends through the mandrel and has its ends projecting into slots 32 formed in the tubular member. A spring 33 retains the mandrel normally in its retracted position. As here shown, the rear portion of the bore of the tubular member is enlarged. as shown at 34, to receive the spring 33. A collar 35 secured to the mandrel adjacent to the pin 31 fits within the enlarged portion of the tubular member and maintains the mandrel in axial alinement with the tubular member. The spring 33 is confined between the collar 35 and the shoulder at the forward end of the enlarged portion of the bore. The mandrel is provided near its forward end with a tapered portion 36 to engage the end of the tube and flare the same. Preferably the forward end of the mandrel, in advance of the tapered portion 36, is of reduced diameter, as shown at 37, and is adapted to enter the tube and accurately center the mandrel with relation thereto, the forward end of this reduced portion being rounded, as shown at 38, to facilitate its entrance into the tube. When the mandrel has been moved into line with the tube, and while the tubular member and mandrel are rotating, the mandrel is actuated to cause the tapered portion thereof to engage the end of the tube and thus flare the same outwardly. The tapered portion of the mandrel may directly engage the end of the tube, if desired, but I find that a more satisfactory operation is had if the tapered portion of the tube is provided with two or more rollers 39 which engage the tube and roll the end thereof outwardly.

The operation of the cutter sometimes leaves a burr or rough edge on the end of the tube and the mandrel is provided with means for removing this burr and leaving the flared end of the tube with a smooth clean edge. For this purpose I have secured to the mandrel a stationary cutter 40 which overlaps the tapered portion thereof and is adapted to engage the outer edge of the flared end of the tube and shave off any burr or roughness which may be on this edge. The reduced portion 37 of the mandrel is slotted, as shown at 41, and a blade or cutter 42 is pivotally mounted within the slot and the rear end thereof is forced outwardly by a spring 43. When the end of the mandrel is inserted in the tube the blade 42 will be forced inwardly but the action of the spring will press the same against the inner surface of the tube and as the mandrel is revolving at a relatively high speed this blade will remove any burr or roughness on the inner end of the tube before the latter comes in contact with the tapered portion of the mandrel. Longitudinal movement may be imparted to the mandrel in any suitable manner but, in the present instance, an operating handle or lever 44 is pivotally mounted at one end on a fixed support 45 carried by the pivoted frame and is connected by a link 46 with the rear end of the mandrel, the pivotal connections being preferably of the ball and socket type. The frame may be swung from one position to the other in any desired manner, but preferably is provided with a handle 60 for this purpose.

The cutter 27 and the mandrel are driven from the motor and this motor is preferably carried by the swinging frame. For this purpose the frame member 22 has a downwardly extending portion 47 provided at its lower end with a base 48 on which is mounted a motor 49, the shaft 50 of which has secured thereto a grooved pulley 51. Grooved pulleys 52 and 53 are secured respectively to the cutter shaft 26 and to the tubular member 28 which carries the mandrel. A belt 54 extends about the pulleys 51, 52 and 53. In the arrangement here shown that portion of the belt between the pulleys 52 and 53 is looped downwardly toward the motor and passed about an idle pulley 55 on the shaft 21, thus causing larger portions of the belt to operatively engage the two driven pulleys than would be the case if the belt extended straight across the space between the driven pulleys.

In the operation of the mechanism the tube is first mounted in the tube support and the frame is then swung to the left, in Fig. 2, to cause the cutter to sever the end of the tube. After the end of the tube has been severed or trimmed the frame is swung in the opposite direction to bring the mandrel into alinement with the tube and the mandrel is then pressed forwardly by the lever 44 and thus caused to engage and flare the tube, after which the handle is released and the mandrel is withdrawn by the spring 33. The swinging frame is held normally in an intermediate or inoperative position by means of a spring-pressed plunger 56 mounted in the frame member 22 and adapted to enter the recess 57 in the upwardly extending bracket or lug 19 on the base 10. This plunger is also adapted to correctly position the mandrel with relation to the tube and retain the same in that position during the flaring operation. To this end the lug 19 is provided with a second recess 58 to receive the plunger when the mandrel is in alinement with the tube. The plunger may be operated in any desired manner, but it is here shown as provided with a head 59 by means of which it may be retracted against the action of its spring.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In a tube cutting and flaring machine, a support for the tube, a rotatable cutter mounted for bodily movement into engagement with a tube on said support, a mandrel mounted for both rotary and axial movement and having a part to engage and flare said tube, means for moving said mandrel into alinement with said tube and imparting axial movement thereto, and means for rotating said cutter and said mandrel.

2. In a tube cutting and flaring machine, a support for the tube, a frame mounted for movement transversely to the tube on said support, a cutter rotatably mounted on said frame, a mandrel mounted on said frame for both rotary and axial movement with relation thereto and having a part to engage and flare said tube, means for actuating said frame to move said cutter and said mandrel successively into operative relation to said tube and for imparting axial movement to said mandrel, and means for rotating said cutter and said mandrel.

3. In a tube cutting and flaring machine, a support for the tube, a frame mounted for movement transversely to the tube on said support, a cutter rotatably mounted on said frame, a mandrel mounted on said frame for both rotary and axial movement with relation thereto and having a part to engage and flare said tube, means for actuating said frame to move said cutter and said mandrel successively into operative relation to said tube and for imparting axial movement to said mandrel, and means carried by said frame for rotating said cutter and said mandrel.

4. In a tube cutting and flaring machine, a support for the tube, a frame mounted for movement transversely to the tube on said support, a cutter rotatably mounted on said frame, a tubular member rotatably mounted on said frame, a mandrel mounted in said tubular member for rotation therewith and for axial movement with relation thereto and having a part to engage and flare the end of said tube, means for imparting axial movement to said mandrel, and means for rotating said tubular member and said cutter.

5. In a tube cutting and flaring machine, a support for the tube, a frame mounted for movement transversely to a tube on said support, a shaft rotatably mounted in said frame, a cutter carried by said shaft, a tubular member rotatably mounted on said frame, a mandrel mounted in said tubular member for rotation therewith and for axial movement with relation thereto and having a part to engage and flare the end of said tube, means for imparting axial movement to said mandrel, a motor mounted on said frame for movement therewith, and driving connections between said motor and said shaft and said tubular member.

6. In a tube cutting and flaring machine, a support for the tube, a frame pivotally mounted for movement about an axis extending lengthwise of the tube on said support, a cutter rotatably mounted on said frame, a mandrel rotatably and slidably mounted on said frame, spaced from said cutter and having a part to engage and flare the end of said tube, means for imparting longitudinal movement to said mandrel, and means for rotating said cutter and said mandrel.

7. In a tube cutting and flaring machine, a supporting structure having a part forming a support for a tube, a frame pivotally mounted on said supporting structure and having spaced bearings arranged normally on the opposite sides of said tube support, a shaft journaled in one of said bearings, a cutter rigidly secured to said shaft and arranged to be moved into engagement with a tube in said support when said frame is moved in one direction, a mandrel supporting device rotatably mounted in the other bearing of said frame, a mandrel mounted in said device for rotation therewith and for longitudinal movement with relation thereto, said mandrel being so arranged that it will be brought into line with said tube when said frame is moved in the other direction, means for imparting longitudinal movement to said mandrel, and means for rotating said shaft and said mandrel supporting device.

8. In a tube cutting and flaring machine, a supporting structure having a part forming a support for a tube, a frame pivotally mounted on said supporting structure and having spaced bearings arranged normally on the opposite sides of said tube support, a shaft journalled in one of said bearings, a cutter rigidly secured to said shaft and arranged to be moved into engagement with the tube in said support when said frame is moved in one direction, a mandrel supporting device rotatably mounted in the other bearing of said frame, a mandrel mounted in said device for rotation therewith and for longitudinal movement with relation thereto, said mandrel being so arranged that it will be brought into line with said tube when said frame is moved in the other direction, means for imparting longitudinal movement to said mandrel, said frame having a part arranged below the axis thereof, a motor supported on said part, and driving connections between said motor and said shaft and said mandrel supporting device.

9. In a tube cutting and flaring machine, a supporting structure having a part forming a support for a tube, a frame pivotally mounted on said supporting structure and having spaced bearings arranged normally on the opposite sides of said tube support, a shaft journaled in one of said bearings, a cutter rigidly secured to said shaft and arranged to be moved into engagement with the tube in said support when said frame is moved in one direction, a mandrel supporting device rotatably mounted in the other bearing of said frame, a mandrel mounted in said device for rotation therewith and for longitudinal movement with relation thereto, said mandrel being so arranged that it will be brought into line with said tube when said frame is moved in the other direction, means for imparting longitudinal movement to said mandrel, and means for rotating said shaft and said mandrel supporting device, and a locking device to retain said frame in a position to which it has been moved.

10. In a machine of the character described, a support for a tube, a frame mounted for movement transversely to a tube on said support, a mandrel mounted on said frame for both rotary and axial movement with relation thereto, said mandrel having a tapered part to enter the end of said tube, rollers mounted in said tapered part of said mandrel to engage said tube and flare the same, and means for rotating said mandrel and for imparting axial movement thereto.

11. In a machine of the character described, a frame, a supporting member rotatably mounted on said frame, a mandrel mounted in said supporting member for rotation therewith and for lengthwise movement with relation thereto, said mandrel having a part to engage and flare the end of a tube, means for rotating said supporting member, and means for imparting lengthwise movement to said mandrel.

12. In a machine of the character described, a frame a supporting member rotatably mounted on said frame, a mandrel mounted in said supporting member for rotation therewith and for lengthwise movement with relation thereto, said mandrel having a part to engage and flare the end of a tube, means for rotating said supporting member, manually actuated means for imparting lengthwise movement to said mandrel, and yieldable means to return said mandrel to its initial position.

13. In a machine of the character described, a frame, a tubular member rotatably mounted on said frame and having means whereby it may be rotated, a mandrel mounted in said tubular member for rotation therewith and for axial movement with relation thereto, said mandrel having a part to enter the end of a tube and flare the same, a spring to hold said mandrel normally in a retracted position, and means for moving said mandrel against the action of said spring while said mandrel rotates with said tubular member.

14. In a machine of the character described, a frame, a supporting member rotatably mounted on said frame, a mandrel mounted in said supporting member for rotation therewith and for lengthwise movement with relation thereto, said mandrel having a part to engage and flare the end of a tube, means for rotating said supporting member, means for imparting lengthwise movement to said mandrel, and means carried by said mandrel for trimming the edge of the end of the tube.

15. In a machine of the character described, a support for a tube, a frame mounted for movement transverse to a tube on said support, a mandrel mounted on said frame for both axial and rotating movement and having a part to engage and flare the end of said tube, and means for rotating said mandrel and for imparting axial movement thereto.

16. In a machine of the character described, a support for a tube, a frame mounted for movement transverse to a tube on said support, a mandrel mounted on said frame for both axial and rotating movement and having a part to engage and flare the end of said tube, means for rotating said mandrel, and manually operated means for imparting axial movement to said mandrel.

17. In a machine of the character described, a support for a tube, a frame mounted for movement transverse to a tube on said support, a supporting member rotatably mounted on said frame, a mandrel mounted in said supporting member for rotation therewith and for lengthwise movement with relation thereto, said mandrel having a part to engage and flare the end of a tube, means for rotating said supporting member, and means for imparting lengthwise movement to said mandrel.

18. In a machine of the character described, a support for a tube, a support for a mandrel, one of said supports being movable transversely to a tube on said support to bring the tube and mandrel into alinement, a mandrel mounted on said frame for both axial and rotating movement and having a part to engage and flare the end of said tube, and means for rotating said mandrel and for imparting axial movement thereto.

19. In a mechanism of the character described, a rotatable supporting structure, a mandrel mounted in said structure for rotation therewith and for longitudinal movement with relation thereto, said mandrel having a reduced end portion to enter a tube and a tapered portion to flare the end of said tube, and means for rotating said supporting structure.

20. In a mechanism of the character described, a rotatable supporting structure, a mandrel mounted in said structure for rotation therewith and for longitudinal movement with relation thereto, said mandrel having a tapered portion to enter the end of a tube and flare the same, and means for rotating said supporting structure, said mandrel also having a part extending beyond said supporting structure whereby longitudinal movement may be imparted to said mandrel while it rotates.

21. In a mechanism of the character described, a tube supporting device, a rotatable structure having an axial bore in line with said tube supporting device, a mandrel mounted in said bore for longitudinal movement and held against rotation with relation to said structure, said mandrel having a tapered portion to enter the end of a tube in said supporting device and flare the same, and means for rotating said structure.

In testimony whereof, I affix my signature hereto.

JOHN W. GORDON.